Sept. 8, 1970        H. J. EAST        3,527,048
ARTICULATED BRACELETS, WATCH STRAPS OR THE LIKE
AND A METHOD OF MAKING SAME
Filed April 2, 1968        2 Sheets-Sheet 1

INVENTOR

Harvey James East

By: Kelman and Berman
Agents

United States Patent Office 3,527,048
Patented Sept. 8, 1970

3,527,048
ARTICULATED BRACELETS, WATCH STRAPS OR THE LIKE AND A METHOD OF MAKING SAME
Harvey James East, Chesham, England, assignor to David Shackman & Sons Limited, Chesham, England
Filed Apr. 2, 1968, Ser. No. 718,121
Claims priority, application Great Britain, Feb. 8, 1968, 6,199/68
Int. Cl. B21l *11/10*
U.S. Cl. 59—35                                                    4 Claims

ABSTRACT OF THE DISCLOSURE

A bracelet is made up of a multiplicity of closely located transverse members having hollow portions at each end, and these members are connected together at each side of the bracelet by U-shaped keys which bridge the hollow end portions of pairs of bricks and are arranged so that one limb of the U enters the hollow end portion of one member and the other limb thereof enters the hollow end portion of the adjacent member, and the free end of one limb is formed with a laterally directed locking nose which, when the limb is bent towards its other limb, engages behind the inner end of the hollow portion and prevents withdrawal of the key.

BACKGROUND OF THE INVENTION

This invention relates to articulated bracelets, watch straps or the like of the kind comprising hinged together closely located members (usually termed bricks), extending in parallelism transversely to the circumferential length of the bracelet or the like.

The primary object of the invention is to provide an improved bracelet or the like of the above kind and a method of making same which enables the members to be hinged together in a simple and inexpensive manner and permits ready relative hinging of said members to allow flexing of the bracelet, and yet ensures that the members are positively retained interconnected and held against separation.

SUMMARY OF THE INVENTION

According to this invention there is provided an articulated bracelet, watch strap or the like which comprises closely located members extending in parallelism transversely to the circumferential length of the bracelet, each of said members being hollow and divided transversely of its length to form two or more co-axial tunnels having their adjacent opposed ends spaced apart, the said members being connected together by substantially U-shaped bridge pieces or keys each having one limb diverging in the same plane from the other and formed with a locking nose, the arrangement being such that each bridge piece, during assembly of the bracelet, is capable of receiving between its side limbs the thickness of two abutting walls of a pair of adjacent tunnels with the locking nose of said diverging limb passing into the space between co-axial tunnels of said member and the said diverging limb then displaced towards the other limb of the bridge piece or key to move said locking nose behind the inner ends of said abutting walls, thereby preventing withdrawal of said bridge piece or key and so hingedly locking adjacent members together.

According to a preferred method of assembly, the said diverging limb is displaced by the insertion of an adjacent bridge piece or key connecting the bracelet member engaged by said diverging limb to the next member, the non-diverging limb of this adjacent bridge peice engaging with a wedging action between said diverging limb and the inner face of the wall of the tunnel in which it is engaged and acting to bend said diverging limb into parallelism with its non-divergent limb and so engaging the locking nose into the space between the co-axial tunnels of the members and behind the ends of a pair of abutting walls of tunnels of adjacent members.

DESCRIPTION OF THE PREFERRED EMBODIMENTS

Referring to said drawings, an articulated bracelet, watch strap or the like comprises closely located members or bricks 1 extending in parallelism transversely to the circumferential length of the bracelet, and each of said members is hollow and divided transversely of its length into portions constituting three coaxial tunnels 2.

Figure 1:
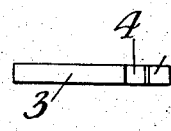
FIGS. 1, 2 and 3 are side, plan and end elevations respectively of a bridge piece or key.
Figure 2:
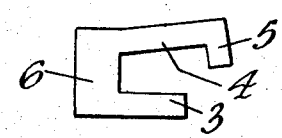
Figure 3:
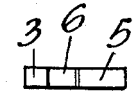

Adjacent pairs of tunnels 2 at each circumferential edge of the bracelet are connected together by substantially U-shape bridge pieces or keys which, as clearly shown in FIGS. 1, 2 and 3, each comprises a straight or non-diverging limb 3, a limb 4 which diverges in the same plan outwardly and away from the non-diverging limb 3 and this diverging limb 4 is formed with a locking nose 5. The closed end of the U which is indicated at 6 is made wider than the width of the limbs 3 and 4, and occupies the space 7 between overhanging end portions 8 of the tunnel portions at the circumferential edges of the bracelet.

Figure 6:
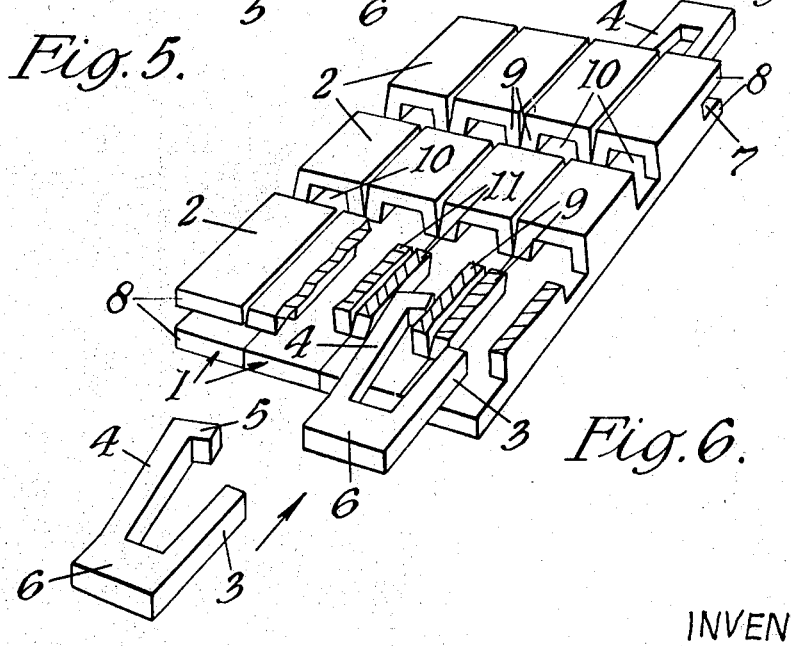
FIG. 6 is a perspective view, partly in section, of a fragment of the bracelet and showing how the bridge pieces or keys are fitted in position.
Figure 7:
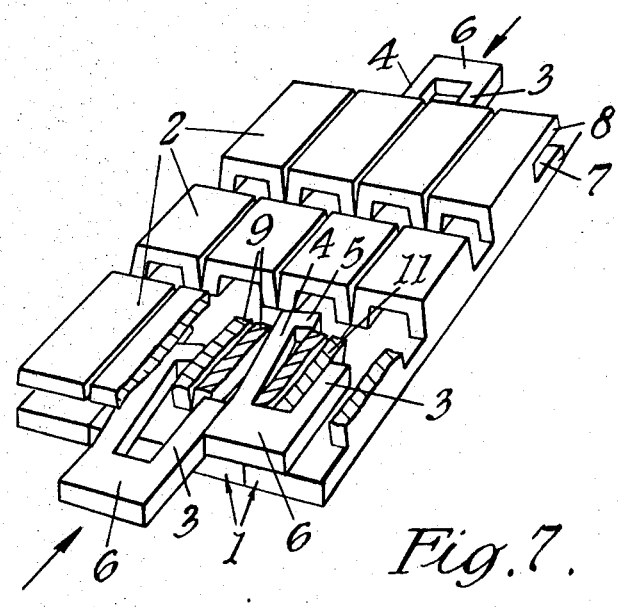
FIG. 7 is a view similar to FIG. 6 showing how the diverging limbs of said bridge pieces are displaced into locking positions.
Figure 8:
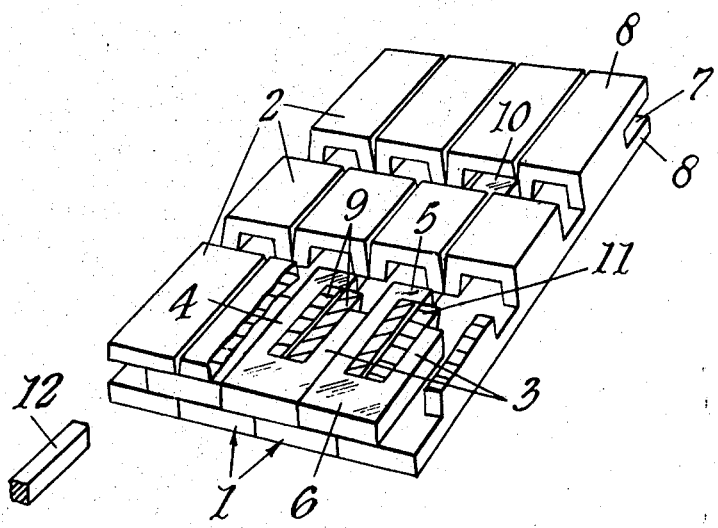
FIG. 8 is a view similar to FIG. 7 showing the bridge pieces in position.

The arrangement is such that each bridge piece, during assembly of the bracelet, is capable of receiving between its limbs 3 and 4 the thickness of two abutting walls 9 (see particularly FIG. 6) of a pair of adjacent tunnel portions 2, and when fully inserted the locking nose 5 at the outer end of the diverging limb 4 passes into the space 10 between co-axial tunnels as clearly shown in FIG. 7. The said diverging limb 4 is then displaced towards the other limb 3 of the bridge piece or key to move said locking nose 5 behind the inner ends 11 of said abutting walls 9 (see FIG. 8), thereby preventing withdrawal of the said bridge piece or key and so locking adjacent members 1 together. Thus, the space within each tunnel at the side edges of the bracelet is completely filled by a limb of each of two adjacent locking keys, i.e. a limb 4 of one key and a limb 3 of an adjacent key.

As shown in FIG. 7, the non-diverging limb 3 of this adjacent bridge piece engages with a wedging action between said diverging limb 4 and the inner face of the wall of the tunnel in which it is engaged, and acts to bend said diverging limb 4 into parallelism with its non-divergent limb and so engages the locking nose 5 in the space 10 between said co-axial tunnels 2 of the members 1 so that it occupies a position in said space behind the ends 11 of adjacent walls of said tunnels.

As clearly shown in FIGS. 1, 2 and 3 the limbs 3 and 4 of each bridge piece are in the same plane.

Figure 4:
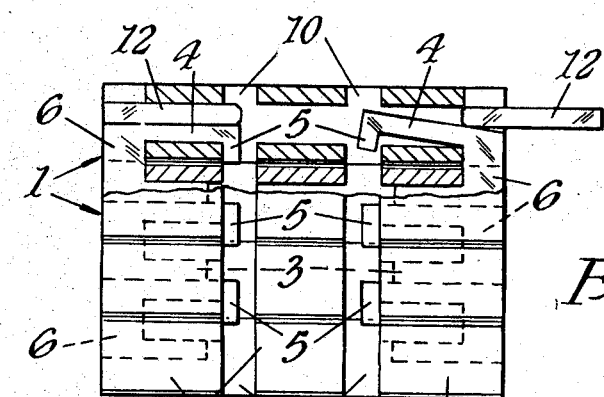
FIG. 4 is a part sectional plan view of a fragmentary portion of the bracelet adjacent one end thereof.
Figure 5:
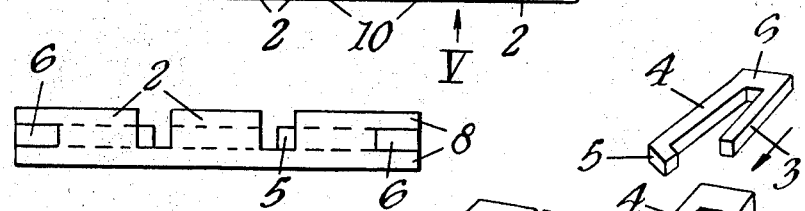
FIG. 5 is a view of FIG. 4 in the direction of the arrow V.

At the extreme ends of the bracelet where bridge pieces are not used, then a keeper pin 12 (FIGS. 4 and 8) may be inserted between each divergent limb 4 of a bridge piece and the inner face of the wall of a tunnel, said keeper pins 12 serving to deflect the divergent limb 4 towards the associated straight limb 3 and engaging said locking nose 5 behind the inner ends 11 of abutting walls of said tunnel portions. Two separate keeper pins 12 may be used, or alternatively, a single bar may be used which extends the complete length of each member 1. The wider closed ends 6 of the bridge pieces become sandwiched between the overlapping parts 8 of the members 1 when the bridge pieces are fully fitted in position and their outer edges are located flush with the outer edges of said portions 8.

The bracelets made in accordance with this invention will normally be made of a precious metal such as gold, which is malleable and will permit ready displacement of the diverging limbs 4 towards their limbs 3 to move the locking nose 5 into position.

The bracelet or the like may, of course, be made of other suitable materials including non-precious materials and synthetic plastics materials, as can also the bridge pieces, but it is essential that the latter should be made of a material which will permit the limbs 4 to be bent and displaced towards said limbs 3. One or both surfaces of the bricks 1 may be engraved or otherwise formed with a decoration.

Although the members or bricks 1 in the above described embodiment each comprise three co-axial tunnels 2 providing two spaces 10 therebetween, it will be appreciated that each member may only comprise two tunnels between which is left a space 10 sufficient to accommodate two sets of back to back locking noses 5.

The various parts are so dimensioned as to provide slight relative movement between themselves to allow the members to articulate and the bracelet to flex and adapt itself to the curvature of a wearer's wrist.

What is claimed is:

1. An articulated bracelet, watch strap or the like comprising closely located members extending in parallelism transversely to the circumferential length of the bracelet, each of said members being hollow and divided transversely of its length to form two or more co-axial tunnels having their adjacent opposed ends spaced apart, the said members being connected together by substantially U-shape bridge pieces or keys each having one limb diverging in the same plane from the other and formed with a locking nose, the arrangement being such that each bridge piece, during assembly of the bracelet, is capable of receiving between its side limbs the thickness of two abutting walls of a pair of adjacent tunnels with the locking nose of said diverging limb passing into the space between co-axial tunnels of said member and the said diverging limb then displaced towards the other limb of the bridge piece or key to move said locking nose behind the inner ends of said abutting walls, thereby preventing withdrawal of said bridge piece or key and so hingedly locking adjacent members together.

2. A bracelet as claimed in claim 1, wherein the space within each tunnel at the side edges of the bracelet is completely filled by a limb of each of two adjacent locking keys.

3. A method of constructing or assembling a bracelet as claimed in claim 1, which comprises displacing each diverging limb of a bridge piece by the insertion of an adjacent bridge piece or key connecting the bracelet member engaged by said diverging limb to the next member, the non-diverging limb of this adjacent bridge piece engaging with a wedging action between said diverging limb and the inner face of the wall of the tunnel in which it is engaged and acting to bend said diverging limb into parallelism with its non-divergent limb and so engaging said locking nose into the space between the co-axial tunnels of the member and behind the ends of a pair of abutting walls of tunnels of adjacent members.

4. The method claimed in claim 3, which further comprises displacing the diverging limbs of bridge pieces in an extreme end member or brick of the bracelet by means of keeper pins.

References Cited

UNITED STATES PATENTS

| | | | |
|---|---|---|---|
| 1,708,466 | 4/1929 | Brandt | 59—80 |
| 1,821,676 | 9/1931 | Simpson | 59—80 |
| 1,822,894 | 9/1931 | Kestenman | 59—80 |
| 1,830,188 | 11/1931 | Bellavance | 59—80 |
| 1,859,819 | 5/1932 | Duerr | 59—80 |
| 1,860,186 | 5/1932 | Kestenman | 59—80 |
| 3,324,649 | 6/1967 | Carlson | 59—79 |

CHARLES W. LANHAM, Primary Examiner

G. P. CROSBY, Assistant Examiner

U.S. Cl. X.R.

59—82